United States Patent [19]
Förster et al.

[11] 3,926,407
[45] Dec. 16, 1975

[54] COCK WITH SHUTOFF MEMBER MOUNTED ECCENTRICALLY AND ROTATABLY IN A HOUSING

[75] Inventors: Siegmar Förster; Walrath Von Klipstein, both of Heidenheim (Brenz), Germany

[73] Assignee: Firma Johannes Erhard, H. Waldenmaier Erben Suddeutsche Armaturenfabrik, Heidenheim, Germany

[22] Filed: Sept. 12, 1973

[21] Appl. No.: 396,531

[30] Foreign Application Priority Data
Apr. 26, 1973 Germany............................ 2321072

[52] U.S. Cl.................................. 251/315; 251/309
[51] Int. Cl............................................... F16k 5/12
[58] Field of Search ............ 251/315, 304, 309, 298

[56] References Cited
UNITED STATES PATENTS

| | | |
|---|---|---|
| 2,663,538 | 12/1953 | Bacchi............................ 251/315 X |
| 2,819,868 | 1/1958 | Cauffman .......................... 251/315 |
| 3,181,834 | 5/1965 | Jennings et al. ................. 251/315 X |
| 3,219,055 | 11/1965 | Dumm............................ 251/315 X |
| 3,326,518 | 6/1967 | Grove ................................. 251/309 |
| 3,473,554 | 10/1969 | King................................ 251/315 X |

*Primary Examiner*—Charles J. Myhre
*Assistant Examiner*—Ira S. Lazarus
*Attorney, Agent, or Firm*—Ernest G. Montague; Karl F. Ross; Herbert Dubno

[57] ABSTRACT

A cock comprising a housing and shutoff member rotatable in the housing about an axis eccentric to the housing azis and provided with a throughgoing passage. A pair of flow cross sections which collectively have an area greater than 10% of the area of the main flow passage and are symmetrical with respect to the throughflow axis. The shutoff member is barrel shaped with equal radii of curvature and centers of curvature located equidistantly from the axis of the shutoff member.

1 Claim, 5 Drawing Figures

COCK WITH SHUTOFF MEMBER MOUNTED ECCENTRICALLY AND ROTATABLY IN A HOUSING

The present invention relates to a cock with shutoff member supported eccentrically and rotatably in the housing. Cocks are known in which the shutoff member engages and is closely surrounded by the housing seat during the opening or closing and thus only has a flow which is controlled by the open cross section of the shutoff member, such as, for instance, plug cocks or ball cocks.

Cocks are also known in which the shutoff member and the housing seat do not contact each other in intermediate positions and thus, in addition to the flow through the open cross section of the shutoff member, also have a flow around the outside of the shutoff member, such as, for instance, plug cocks with a lifting device or ball cocks with controllable seat rings. Such cocks are known with spherical shutoff member and with a small slot in the region of the controlled seat rings; also as cocks with an eccentrically supported shutoff member, in which the area ratios in intermediate positions between the inner shape of the housing and the outer shaping of the shutoff member differ strongly; furthermore as cocks with a shutoff member composed of segment-like pipe parts, the surface relations having suddenly varying cross sections in intermediate positions.

The last-mentioned three cocks have the disadvantage that there is no systematically selected relationship between the area ratio of the passage bore in the shutoff member and the cross section for flow around the shutoff member which is present in intermediate positions. The results of this are rapidly varying cross sections together with resultant turbulence, change in pressure and cavitation.

Cocks in which housing seat and shutoff member touch or do not touch in intermediate positions have the disadvantage that upon the turning of the shutoff member in the direction of opening or closing, greatly differing hydraulic moments of force occur which must be taken up by the drive mechanism. These moments of force result from the changed distribution of pressure, depending on the throttle position of the shutoff member. Furthermore, directly behind the entrance edge lying in the direction of admission, a strong decrease in pressure occurs, from which the hydraulic moment of force results and can be connected with cavitation. Cavitation produces strong vibration with rapidly varying values of the moment of force. These portions of the shutoff member are thus subject to high wear.

It is one object of the present invention to provide a cock which avoids the disadvantages of the known embodiments.

In accordance with another embodiment of the present invention, the free cross sections defined between the inner walls of the housing and the outer walls of the shutoff member are uniform (i.e., free from discontinuities) and symmetrical to the flow axis, the free cross sections together are greater than 10% of the cross section of the plug passage. Furthermore, the shutoff member has an approximately barrel-like outer shape which is defined by two equal radii centered on centers of curvature at equal distance from the center line. By the barrel-formed outer shape of the shutoff member, the opening in the housing for the installation of the shutoff member can be kept small. As has been shown by flow tests, no change in pressure or turbulences occur any longer due to the uniform flow around the shutoff member, and the peak moments of force being done away with and substantially reduced. Furthermore, the support in the housing can be brought close to the shutoff member and thus becomes stable. The ribs within the shutoff member intended to receive the pipe in the passage bore are relatively short. The free cross sections between shutoff member and the inside of the housing are relatively large, whereby even large foreign bodies are washed through.

These and other objects will become more readily apparent from the following detailed description, reference being made to the accompanying drawings, in which.

Figure 1:
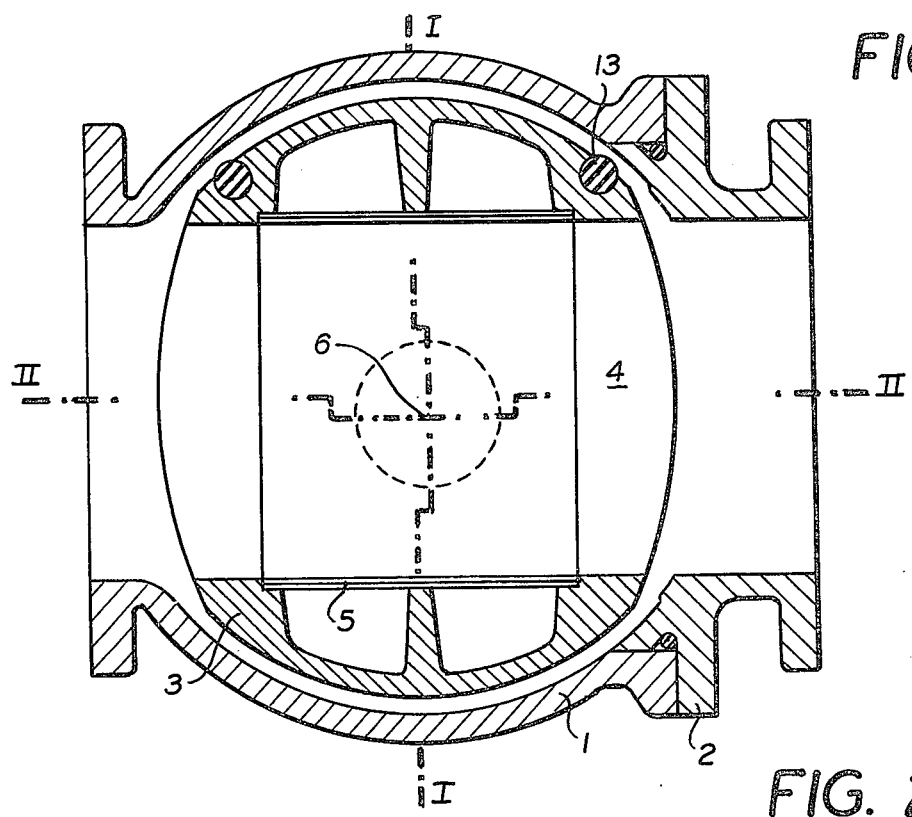
FIG. 1 is a section through the cock in open position.
Figure 2:
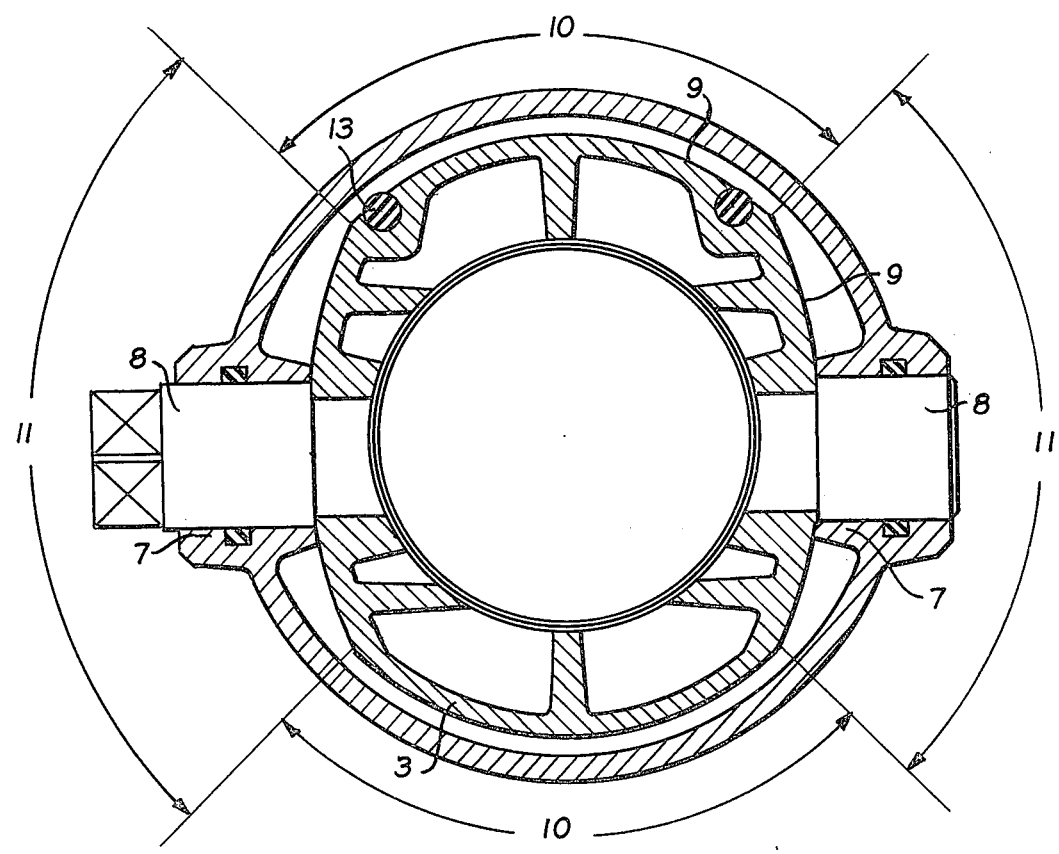
FIG. 2 is a section along the line I — I of FIG. 1.

In FIG. 1 of the drawing the cock is shown in its open position. The inside of the housing 1 has the shape of a ball. In order to install the barrel-shaped shutoff member 3, the housing 1 has an opening into which the housing part 2 is inserted. Housing 1 and housing part 2 have connecting flanges 2' for connection to pipelines. The shutoff member 3 has on the inside a passage bore which is provided with a pipe 5 and has the same cross section as the nominal size of the cock. The axis of rotation 6 of the shutoff member 3 is arranged eccentrically to the housing 1. In accordance with FIG. 2, bearing pins 8 are brought close to the shutoff member 3 with bearing lugs 7 on the barrel-like outer form 9 of the shutoff member 3. The free cross sections 10, 11 produced between the inner part of the housing 1 and the outer form 9 of the shutoff member 3 during the intermediate positions of the shutoff member 3 are symmetrical about the flow axis and collectively are larger than 10% of the cross section of the nominal section of the passage 5.

Figure 3:
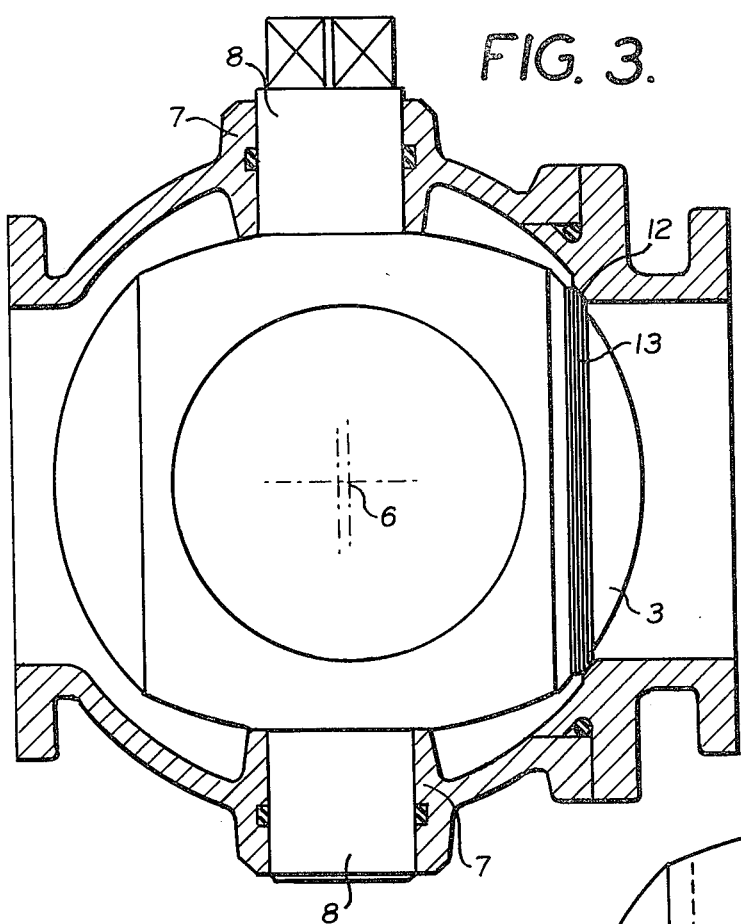
FIG. 3 is a section along the line II—II of FIG. 1; but in a closed position of the shutoff member.

FIG. 3 shows the shutoff member 3 in its closed position. By the eccentrically arranged axis of rotation 6, the shutoff member 3 is moved by the eccentric stroke into the housing seat 12 and seals off by means of elastic O-seals 13.

Figure 4:
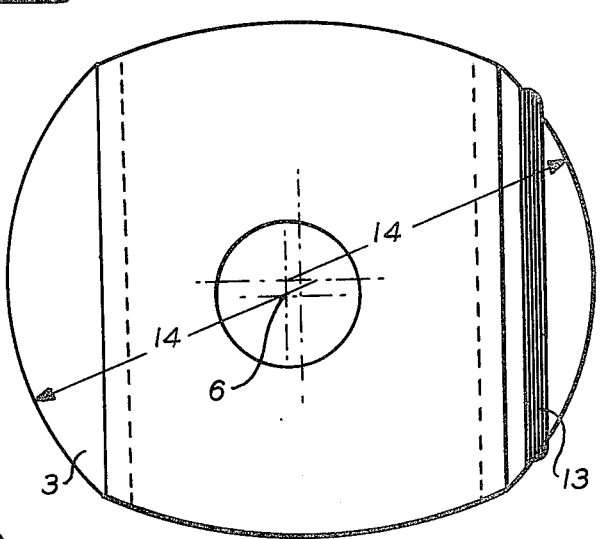
FIG. 4 is an elevation of the barrel-shaped shutoff member.
Figure 5:
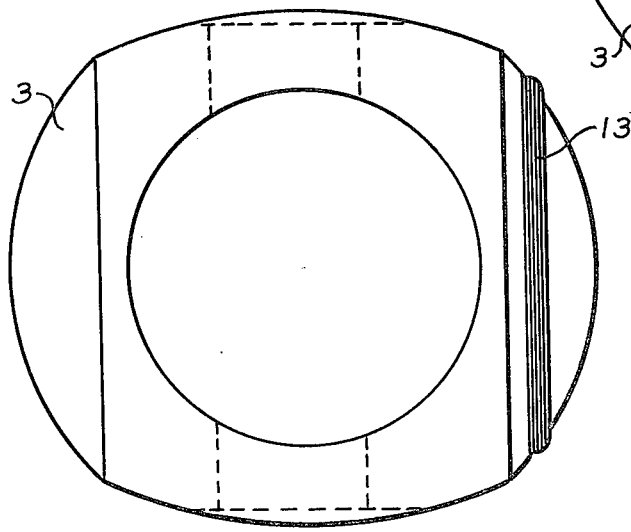
FIG. 5 is a top plan view, seen in the direction of the arrow A in FIG. 4.

In accordance with FIG. 4, the barrel-like outer shape 9 of the shutoff member 3 is limited by two radii 14 of the same dimensions. The two radii 14 are centered at equal distances from the center line of the shutoff member 3.

While I have disclosed one embodiment of the present invention, it is to be understood that this embodiment is given by example only and not in a limiting sense.

We claim:

1. A cock comprising a valve body substantially symmetric about an axis and having an inlet and outlet aligned axially perpendicular to said axis; shutoff member of substantially axially symmetric external configuration rotatable about an axis parallel to and offset from the axis of said body within the latter, said member having a main flow passage extending perpendicular to said axis and alignable with said inlet and said outlet in an open position of said member; sealing means on said member engageable with said body upon rotation of said member into a closed position of said member blocking flow from said inlet to outlet, said member defining with said body in positions of said member intermediate said open position and said closed position free cross sections collectively having a flow area of greater than 10% of the flow area of said main flow passage and extending uniformly and without sharp flow cross section variation in all intermediate positions between said inlet and said outlet while being symmetric with respect to the axis of said body, said member being of barrel external shape and being defined by two equal radii having centers equidistant from the axis of said member and offset to opposite sides of a common axial plane.

* * * * *